United States Patent
Hiroaki (10) Patent No.: US 6,797,977 B2
(45) Date of Patent: Sep. 28, 2004

(54) RADIATION IMAGE READ-OUT METHOD AND APPARATUS

(75) Inventor: Yasuda Hiroaki, Kaisei-machi (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 199 days.

(21) Appl. No.: 10/252,382

(22) Filed: Sep. 24, 2002

(65) Prior Publication Data
US 2003/0057387 A1 Mar. 27, 2003

(30) Foreign Application Priority Data
Sep. 26, 2001 (JP) .................................... 2001-293331

(51) Int. Cl.$^7$ ............................................. G03B 42/08
(52) U.S. Cl. ...................................... 250/586; 250/581
(58) Field of Search ................................ 250/581, 584, 250/585, 586

(56) References Cited

U.S. PATENT DOCUMENTS

| | | | |
|---|---|---|---|
| 4,591,715 A | * | 5/1986 | Goto .......................... 250/585 |
| 4,816,679 A | | 3/1989 | Sunagawa et al. |
| 4,922,103 A | | 5/1990 | Kawajiri et al. |

FOREIGN PATENT DOCUMENTS

| | | |
|---|---|---|
| JP | 60-111568 | 6/1985 |
| JP | 60-236354 | 11/1985 |
| JP | 1-101540 | 4/1989 |

* cited by examiner

Primary Examiner—Constantine Hannaher
Assistant Examiner—Timothy J. Moran
(74) Attorney, Agent, or Firm—Sughrue Mion, PLLC

(57) ABSTRACT

Stimulating rays are irradiated linearly along a main scanning direction onto a stimulable phosphor sheet, on which a radiation image has been stored, and light emitted from the linear area of the sheet exposed to the linear stimulating rays is received with a line sensor via a light collecting optical system. The line sensor comprises photoelectric conversion devices arrayed along the main scanning direction. An optical guide member is located between the light collecting optical system and the line sensor. The optical guide member has a reflection surface for reflecting the emitted light, which has been radiated out from the light collecting optical system and has spread over a range wider than a width of each of the photoelectric conversion devices, the width being taken in a sub-scanning direction, such that the photoelectric conversion devices can receive the emitted light.

14 Claims, 9 Drawing Sheets

SECT. I-I

Y DIRECTION

FIG.8

Y DIRECTION

FIG.9

Y DIRECTION

RADIATION IMAGE READ-OUT METHOD AND APPARATUS

BACKGROUND OF THE INVENTION

1. Field of the Invention

This invention relates to a radiation image read-out method and apparatus. This invention particularly relates to a radiation image read-out method and apparatus, wherein a radiation image having been stored on a stimulable phosphor sheet is read out with a line sensor comprising a plurality of photoelectric conversion devices, which are arrayed in a straight line.

2. Description of the Related Art

It has been proposed to use stimulable phosphors in radiation image recording and reproducing systems for computed radiography (CR). Specifically, radiation carrying image information of an object, such as a human body, is irradiated to a stimulable phosphor sheet, which comprises, for example, a substrate and a layer of the stimulable phosphor overlaid on the substrate. In this manner, a radiation image of the object is recorded on the stimulable phosphor sheet. Thereafter, with radiation image read-out apparatuses, stimulating rays, such as a laser beam, are irradiated to the stimulable phosphor sheet, on which the radiation image of the object has been stored. The stimulating rays cause the stimulable phosphor sheet to emit light in proportion to the amount of energy stored thereon during its exposure to the radiation. The light emitted by the stimulable phosphor sheet is photoelectrically detected and converted into an electric image signal.

Novel radiation image read-out apparatuses for use in the radiation image recording and reproducing systems utilizing the stimulable phosphor sheets described above have been proposed in, for example, Japanese Unexamined Patent Publication Nos. 60(1985)-111568, 60(1985)-236354, and 1(1989)-101540. In the proposed radiation image read-out apparatuses, from the point of view of keeping the emitted light detection time short, reducing the size of the apparatus, and keeping the cost low, a line light source for irradiating linear stimulating rays onto a stimulable phosphor sheet is utilized as a stimulating ray source, and a line sensor comprising a plurality of photoelectric conversion devices arrayed along the length direction of a linear area of the stimulable phosphor sheet, onto which linear area the stimulating rays are irradiated by the line light source, is utilized in order to detect the light emitted by the stimulable phosphor sheet. (The length direction of the linear area of the stimulable phosphor sheet will hereinbelow be referred to as the main scanning direction.) Also, the proposed radiation image read-out apparatuses comprise scanning means for moving the stimulable phosphor sheet with respect to the line light source and the line sensor and in a direction, which is approximately normal to the length direction of the linear area of the stimulable phosphor sheet. (The direction, which is approximately normal to the length direction of the linear area of the stimulable phosphor sheet, will hereinbelow be referred to as the sub-scanning direction.)

However, in the radiation image read-out apparatuses described above, when the linear stimulating rays are irradiated to the stimulable phosphor sheet, the light emitted from the exposed area of the stimulable phosphor sheet takes on the form of a spread light having predetermined spread (of approximately 600 $\mu$m in the sub-scanning direction) due to scattering of the stimulating rays within the stimulable phosphor sheet and diffusion of the light emitted by the stimulable phosphor sheet. Also, in cases where a charge coupled device (CCD) is utilized as each of the photoelectric conversion devices for receiving the light emitted by the stimulable phosphor sheet, it is not always possible to set the width of the CCD, which width is taken in the sub-scanning direction, to be large. Practically, the width of the CCD, which width is taken in the sub-scanning direction, is capable of being set to be at most approximately 100 $\mu$m. The width of the CCD, which width is taken in the sub-scanning direction, is thus smaller than the width of the spread light described above. Therefore, the CCD cannot receive all of the light emitted from the corresponding site of the exposed area of the stimulable phosphor sheet, and the light collecting efficiency cannot be kept high. Also, such that sufficient radiation absorption may be obtained, it is necessary for the stimulable phosphor layer of the stimulable phosphor sheet to have a certain value of thickness. Therefore, even though the width of the linear stimulating rays impinging upon the linear area of the stimulable phosphor sheet, which width is taken in the sub-scanning direction, is narrow, the scattering of the stimulating rays within the stimulable phosphor sheet and the diffusion of the light emitted by the stimulable phosphor sheet occur inevitably, and it is not always possible to set the width of the spread light described above to be smaller than the width of the CCD. Further, in cases where an image of the spread light described above is formed on the photoelectric conversion device by use of a contracting optical system comprising a lens, the light collecting efficiency cannot be kept high. Furthermore, a technique has been proposed, wherein a tapered fiber is located on the light receiving surface of the CCD, and the spread light described above is thereby contracted, such that the light collecting efficiency may not become low. However, the proposed technique has the problems in that the tapered fiber is expensive, and limitation is imposed upon an aperture ratio.

SUMMARY OF THE INVENTION

The primary object of the present invention is to provide a radiation image read-out method wherein, in cases where light emitted from an area of a stimulable phosphor sheet exposed to stimulating rays has predetermined spread, and a width of each of photoelectric conversion devices for receiving the emitted light, which width is taken in a sub-scanning direction, is smaller than the width of the spread light, which width is taken in the sub-scanning direction, an efficiency with which the emitted light is collected is capable of being enhanced, and an image signal having a high signal-to-noise ratio is capable of being obtained.

Another object of the present invention is to provide an apparatus for carrying out the radiation image read-out method.

The present invention provides a radiation image read-out method, comprising the steps of:

i) linearly irradiating stimulating rays onto an area of a surface of a stimulable phosphor sheet, on which a radiation image has been stored, with stimulating ray irradiating means, such that the stimulating rays are linear along a main scanning direction on the surface of the stimulable phosphor sheet, the stimulating rays causing the stimulable phosphor sheet to emit light in proportion to an amount of energy stored thereon during its exposure to radiation, ii) receiving the light, which is emitted from the linear area of the surface of the stimulable phosphor sheet exposed to the linear stimulating rays, with a line sensor via a light collecting optical system, the line sensor comprising a plurality of photoelectric conversion devices arrayed in a straight line along the main scanning direction, the received light being subjected to photoelectric conversion performed by the line sensor, iii) moving the stimulable phosphor sheet with respect to the stimulating ray irradiating means and the line sensor and in a sub-scanning direction, and iv) successively reading outputs of the line sensor in accordance with the movement, wherein an optical guide member is located between the light collecting optical system and the line sensor, the optical guide member having a reflection surface for reflecting the emitted light components of the emitted light, which emitted light components have been radiated out from the light collecting optical system and have spread over a range wider than a width of each of the photoelectric conversion devices, the width being taken in the sub-scanning direction, such that the photoelectric conversion devices are capable of receiving the emitted light components.

The present invention also provides a radiation image read-out apparatus for carrying out the radiation image read-out method in accordance with the present invention. Specifically, the present invention also provides a radiation image read-out apparatus, comprising:

i) stimulating ray irradiating means for linearly irradiating stimulating rays onto an area of a surface of a stimulable phosphor sheet, on which a radiation image has been stored, such that the stimulating rays are linear along a main scanning direction on the surface of the stimulable phosphor sheet, the stimulating rays causing the stimulable phosphor sheet to emit light in proportion to an amount of energy stored thereon during its exposure to radiation, ii) a line sensor for receiving the light, which is emitted from the linear area of the surface of the stimulable phosphor sheet exposed to the linear stimulating rays, via a light collecting optical system, and performing photoelectric conversion of the received light, the line sensor comprising a plurality of photoelectric conversion devices arrayed in a straight line along the main scanning direction, iii) scanning means for moving the stimulable phosphor sheet with respect to the stimulating ray irradiating means and the line sensor and in a sub-scanning direction, and iv) reading means for successively reading outputs of the line sensor in accordance with the movement, wherein an optical guide member is located between the light collecting optical system and the line sensor, the optical guide member having a reflection surface for reflecting the emitted light components of the emitted light, which emitted light components have been radiated out from the light collecting optical system and have spread over a range wider than a width of each of the photoelectric conversion devices, the width being taken in the sub-scanning direction, such that the photoelectric conversion devices are capable of receiving the emitted light components.

The term "photoelectric conversion device" as used herein means a CCD, a photodiode of a CMOS image sensor, or the like.

The expression of "emitted light components having been radiated out from a light collecting optical system and having spread over a range wider than a width of each of photoelectric conversion devices, the width being taken in a sub-scanning direction" as used herein means the emitted light components, which have spread in the sub-scanning direction due to scattering of the stimulating rays within the stimulable phosphor sheet and diffusion of the light emitted by the stimulable phosphor sheet, and all of which cannot be collected onto the light receiving surfaces of the photoelectric conversion devices of the line sensor with the light collection by the light collecting optical system alone.

In the radiation image read-out method and apparatus in accordance with the present invention, the reflection surface of the optical guide member need not necessarily be a flat surface and may be a curved surface.

Also, in the radiation image read-out method and apparatus in accordance with the present invention, the optical guide member should preferably have a refractive index such that the emitted light components are totally reflected by the reflection surface of the optical guide member. Alternatively, in cases where the refractive index of the optical guide member is not set such that the emitted light components are totally reflected by the reflection surface of the optical guide member, the reflection surface of the optical guide member may be covered with a reflecting material capable of reflecting the emitted light components.

Further, the radiation image read-out method and apparatus in accordance with the present invention should preferably be modified such that the optical guide member is a trapezoidal prism constituted of a transparent member, the trapezoidal prism being located close to a light receiving surface of the line sensor, a surface of the trapezoidal prism, the surface having a rectangular shape whose one side is constituted of a longer side between two parallel sides of the trapezoid, acts as a light entry end face, from which the emitted light enters into the trapezoidal prism, a surface of the trapezoidal prism opposite to the light entry end face acts as a light radiating end face, from which the emitted light is radiated out of the trapezoidal prism, at least either one of two rectangular surfaces other than the light entry end face and the light radiating end face acts as the reflection surface, whereby the emitted light components having entered from the light entry end face into the trapezoidal prism are reflected by the reflection surface and radiated out from the light radiating end face.

The term "trapezoidal prism" as used herein means the prism having a trapezoidal cross-section.

Furthermore, the radiation image read-out method and apparatus in accordance with the present invention should preferably be modified such that the trapezoidal prism constituting the optical guide member is divided into a plurality of subdivisions at predetermined pitches with respect to the main scanning direction, and a divisional cross-section of each of the subdivisions of the trapezoidal prism is set to be capable of reflecting the emitted light.

In such cases, the predetermined pitches, at which the trapezoidal prism constituting the optical guide member is divided into the plurality of the subdivisions, should preferably be identical with the array pitches of the photoelectric conversion devices with respect to the main scanning direction.

Also, in such cases, the divisional cross-section of each of the subdivisions of the trapezoidal prism should preferably be covered with a reflecting material capable of reflecting the emitted light.

The term "reflecting material" as used herein means one of various materials capable of reflecting the emitted light.

The term "covering with a reflecting material" as used herein means, for example, coating of the reflecting material on the reflection surface or the divisional cross-section of the optical guide member, formation of a layer of the reflecting material with a vacuum evaporation technique, or the like.

Also, the radiation image read-out method and apparatus in accordance with the present invention should preferably be modified such that the optical guide member is a prism, which is located on a side outward from at least either one of two ends of a light receiving surface of the line sensor, the two ends being taken with respect to the sub-scanning direction, and at a position close to the at least either one of the two ends of the light receiving surface of the line sensor, and which extends along the main scanning direction.

In such cases, the shape of the prism, which is located on the side outward from the at least either one of the two ends of the light receiving surface of the line sensor, maybe selected from various shapes, such as a triangular prism and a trapezoidal prism, which have the reflection surfaces described above. However, the prism, which is located on the side outward from the at least either one of the two ends of the light receiving surface of the line sensor, should preferably have a shape such that the prism is capable of being located easily on the side outward from the at least either one of the two ends of the light receiving surface of the line sensor, the two ends being taken with respect to the sub-scanning direction, and at the position close to the at least either one of the two ends of the light receiving surface of the line sensor.

As will be understood from the specification, it should be noted that the term "moving a stimulable phosphor sheet with respect to stimulating ray irradiating means and a line sensor and in a sub-scanning direction" as used herein means movement of the stimulable phosphor sheet relative to the stimulating ray irradiating means and the line sensor, and embraces the cases wherein the stimulable phosphor sheet is moved while the stimulating ray irradiating means and the line sensor are kept stationary, the cases wherein the stimulating ray irradiating means and the line sensor are moved while the stimulable phosphor sheet is kept stationary, and the cases wherein both the stimulable phosphor sheet and the stimulating ray irradiating means and the line sensor are moved. In cases where the stimulating ray irradiating means and the line sensor are moved, they should be moved together with each other.

With the radiation image read-out method and apparatus in accordance with the present invention, the emitted light components of the emitted light, which emitted light components have been radiated out from the light collecting optical system and have spread over the range wider than the width of each of the photoelectric conversion devices, the width being taken in the sub-scanning direction, are reflected by the reflection surface of the optical guide member and received by the photoelectric conversion devices. Therefore, the efficiency with which the emitted light is collected is capable of enhanced, and an image signal having a high signal-to-noise ratio is capable of being obtained.

With the radiation image read-out method and apparatus in accordance with the present invention, the optical guide member may have the refractive index such that the emitted light components are totally reflected by the reflection surface of the optical guide member. In such cases, a process for covering the reflection surface with the reflecting material, or the like, need not be performed, and the effects described above are capable of being obtained.

With the radiation image read-out method and apparatus in accordance with the present invention, the optical guide member may be the trapezoidal prism constituted of the transparent member, and the trapezoidal prism may be located close to the light receiving surface of the line sensor. In such cases, the optical guide member is capable of being produced easily.

With the radiation image read-out method and apparatus in accordance with the present invention, the trapezoidal prism constituting the optical guide member may be divided into the plurality of the subdivisions at predetermined pitches with respect to the main scanning direction. Also, the divisional cross-section of each of the subdivisions of the trapezoidal prism may be set to be capable of reflecting the emitted light. In such cases, the problems are capable of being prevented from occurring in that the light emitted from a certain site (a certain pixel) on the stimulable phosphor sheet is adversely affected by the light emitted from a pixel on the stimulable phosphor sheet, which pixel is adjacent to the certain pixel in the main scanning direction. Therefore, an image signal representing an image having a high image sharpness is capable of being obtained.

With the radiation image read-out method and apparatus in accordance with the present invention, the optical guide member may be the prism, which is located on the side outward from the at least either one of the two ends of the light receiving surface of the line sensor, the two ends being taken with respect to the sub-scanning direction, and at the position close to the at least either one of the two ends of the light receiving surface of the line sensor, and which extends along the main scanning direction. In such cases, the optical guide member is capable of being easily fitted to the line sensor.

With the radiation image read-out method and apparatus in accordance with the present invention, wherein the reflection surface of the optical guide member is covered with the reflecting material capable of reflecting the emitted light components, a material having a high refractive index need not be utilized as the material of the optical guide member, and the emitted light components are capable of being reflected efficiently.

DESCRIPTION OF THE PREFERRED EMBODIMENTS

The present invention will hereinbelow be described in further detail with reference to the accompanying drawings.

Figure 1:
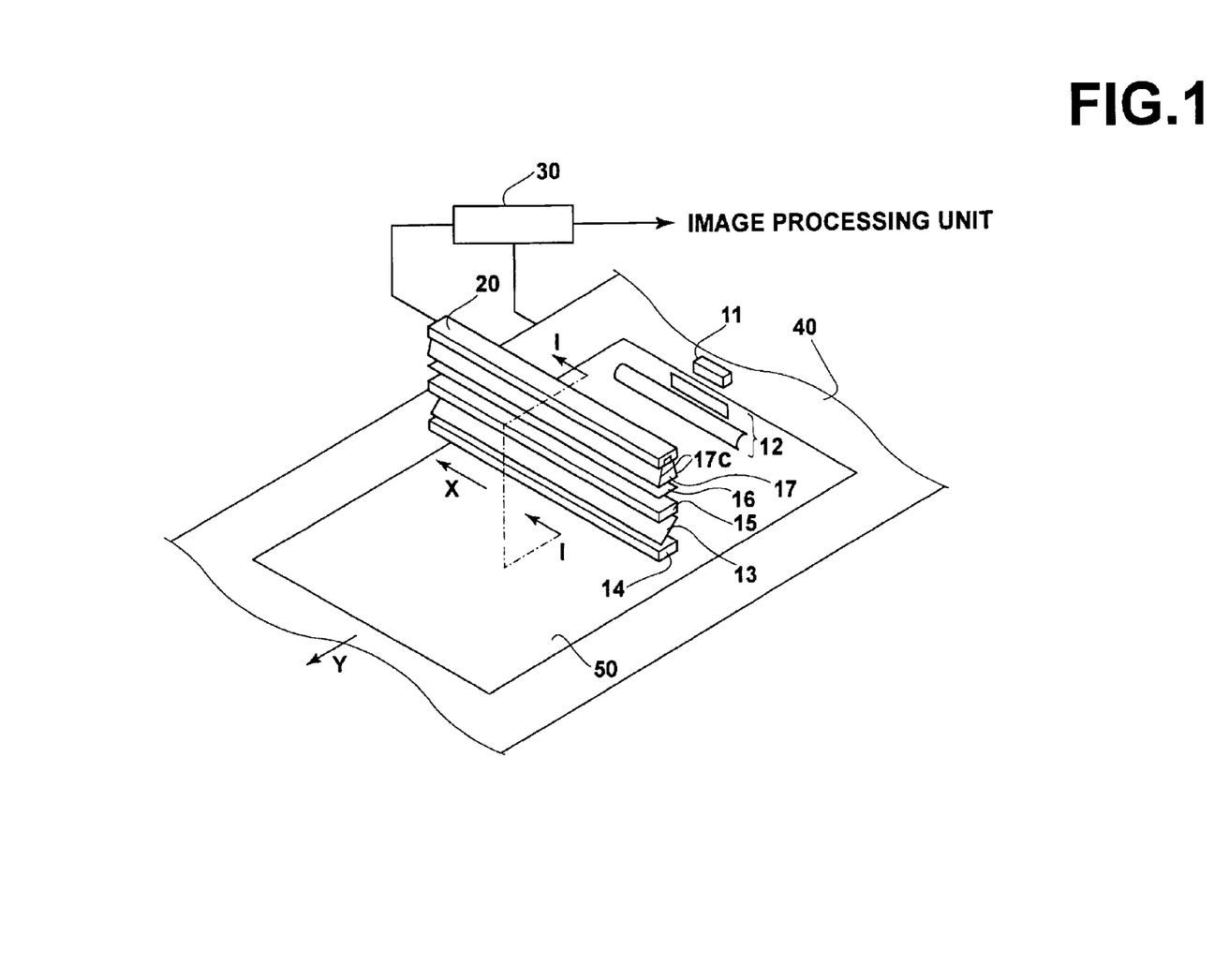
FIG. 1 is a perspective view showing an embodiment of the radiation image read-out apparatus in accordance with the present invention.
Figure 2:
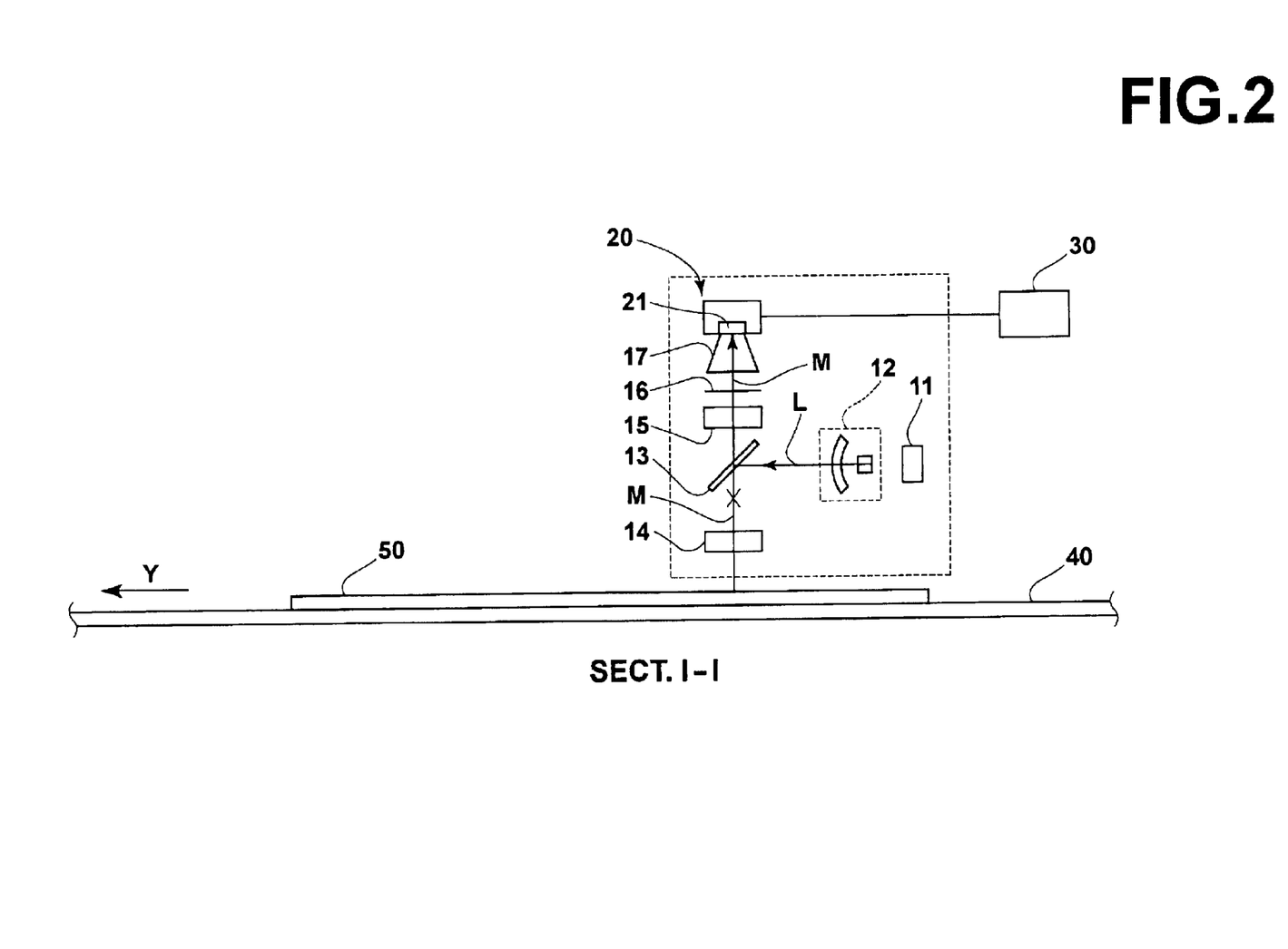
FIG. 2 is a sectional view taken on line I—I of FIG. 1.

FIG. 1 is a perspective view showing an embodiment of the radiation image read-out apparatus in accordance with the present invention. FIG. 2 is a sectional view taken on line I—I of FIG. 1.

With reference to FIG. 1 and FIG. 2, the radiation image read-out apparatus comprises a scanning belt 40 for supporting a stimulable phosphor sheet 50, on which a radiation image has been stored, and conveying the stimulable phosphor sheet 50 in the direction indicated by the arrow Y (i.e., in the sub-scanning direction). The radiation image read-out apparatus also comprises a stimulating ray source 11 for radiating out linear stimulating rays (hereinbelow referred to simply as the stimulating rays) L. The stimulating rays L are radiated out approximately in parallel with the surface of the stimulable phosphor sheet 50. The radiation image read-out apparatus further comprises an optical system 12, which is constituted of a combination of a collimator lens for collimating the linear stimulating rays L having been radiated out of the stimulating ray source 11 and a toric lens for expanding the beam only in one direction. The radiation image read-out apparatus still further comprises a dichroic mirror 13, which is located at an angle of 45 degrees with respect to the surface of the stimulable phosphor sheet 50, and which is set so as to reflect the stimulating rays L toward the direction approximately normal to the stimulable phosphor sheet 50 and to transmit emitted light M described later. The radiation image read-out apparatus also comprises a distributed index lens array (hereinbelow referred to as the first SELFOC lens array) 14. The first SELFOC lens array 14 converges the linear stimulating rays L, which have been reflected from the dichroic mirror 13, into a linear beam extending along the main scanning direction indicated by the arrow X on the stimulable phosphor sheet 50. Also, the first SELFOC lens array 14 collimates the emitted M, which is emitted by the stimulable phosphor sheet 50 exposed to the linear stimulating rays L and which carries image information of the radiation image stored on the stimulable phosphor sheet 50. The radiation image read-out apparatus further comprises a second SELFOC lens array 15 for converging the emitted light M, which has been collimated by the first SELFOC lens array 14 and has then passed through the dichroic mirror 13, onto a light entry end face of an optical guide member 17, which will be described later. The radiation image read-out apparatus still further comprises a stimulating ray cut-off filter 16 for transmitting only the emitted light M and filtering out the stimulating rays L, which have been reflected from the surface of the stimulable phosphor sheet 50 and which are mixed slightly in the emitted light M having passed through the second SELFOC lens array 15. The radiation image read-out apparatus also comprises the optical guide member 17 for guiding the emitted light M, which has been collected by the second SELFOC lens array 15, toward light receiving surfaces of photoelectric conversion devices 21, 21, . . . of a line sensor 20, which will be described below. The radiation image read-out apparatus further comprises the line sensor 20 for receiving the emitted light M, which have been guided by the optical guide member 17, with the light receiving surfaces of the photoelectric conversion devices 21, 21, . . . , and for photoelectrically converting the emitted light M. The radiation image read-out apparatus still further comprises reading means 30 for reading a signal having been outputted from the line sensor 20.

The stimulating ray source 11 may be constituted of a stimulating ray source which radiates out the stimulating rays having the linear pattern. Alternatively, the stimulating ray source 11 may be constituted of a stimulating ray source which radiates out a scanning beam, and the scanning beam having been radiated out from the stimulating ray source may be converted into the linear stimulating rays by an optical system.

The optical system 12, which is constituted of the collimator lens and the toric lens, expands the stimulating rays L, which come from the stimulating ray source 11, into a desired irradiation area on the stimulable phosphor sheet 50.

The first SELFOC lens array 14 and the second SELFOC lens array 15 act such that an image of the emitted light M on the stimulable phosphor sheet 50 is formed in one-to-one size relationship on the light receiving surface of the line sensor 20.

Figure 3:
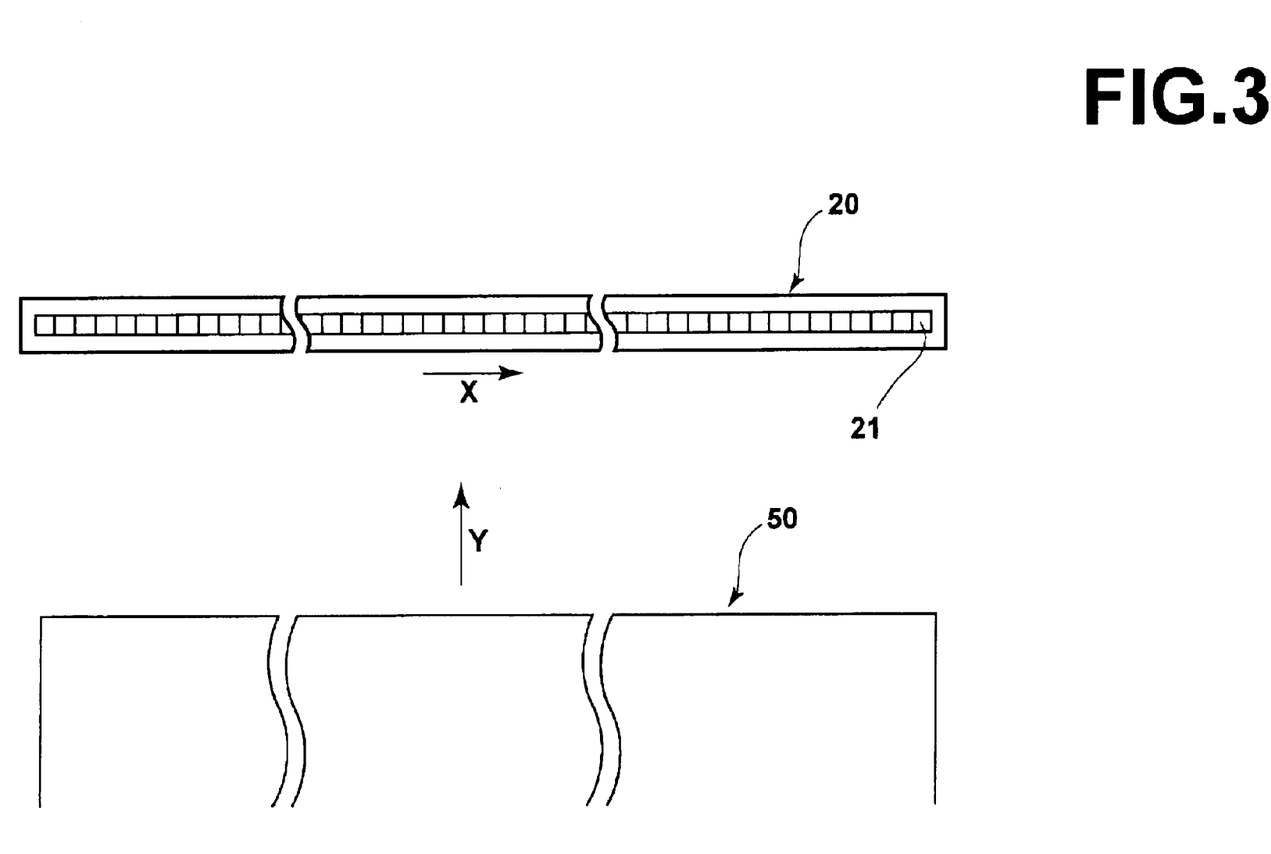
FIG. 3 is an explanatory view showing an example of a line sensor in the embodiment of FIG. 1.

FIG. 3 is an explanatory view showing an example of a line sensor in the embodiment of FIG. 1. As illustrated in FIG. 3, the line sensor 20 comprises the plurality of (e.g., at least 1,000) photoelectric conversion devices 21, 21, . . . arrayed along the main scanning direction indicated by the arrow X. The photoelectric conversion devices 21, 21, . . . are in a packaged form. The line sensor 20 may be an amorphous silicon sensor, a CCD sensor, a CMOS image sensor, or the like.

Figure 4:
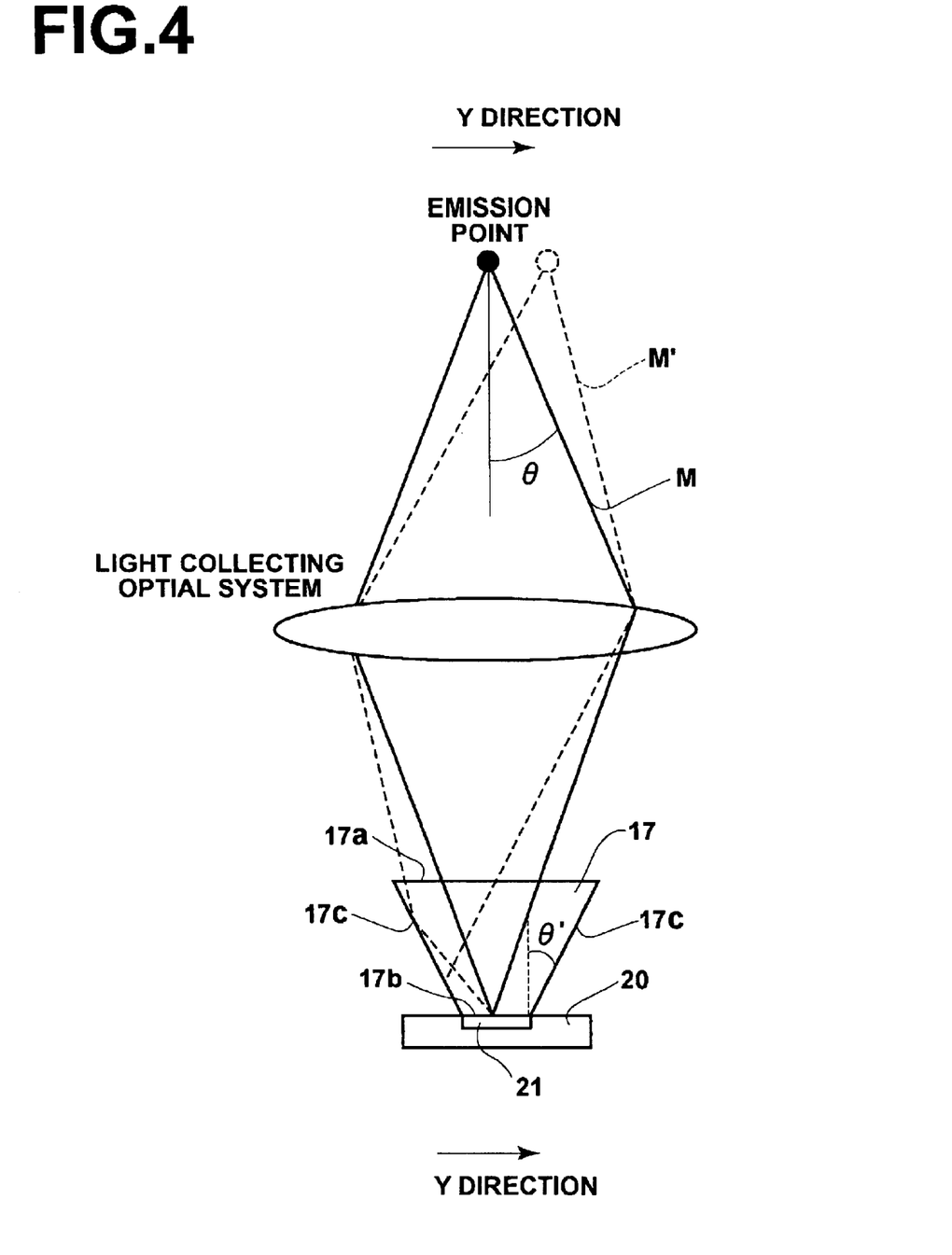
FIG. 4 is an explanatory view showing a first example of an optical guide member in the embodiment of FIG. 1.

FIG. 4 is an explanatory sectional view taken on line I—I of FIG. 1 and showing a first example of an optical guide member in the embodiment of FIG. 1. As illustrated in FIG. 4, the optical guide member 17 is constituted of a trapezoidal prism. The trapezoidal prism is located between the light collecting optical system, which is constituted of the first SELFOC lens array 14 and the second SELFOC lens array 15, such that the trapezoidal prism is close to the light receiving surface of the line sensor 20. A surface 17a of the optical guide member 17, the surface having a rectangular shape whose one side is constituted of a longer side between the two parallel sides of the trapezoid, acts as a light entry end face, from which the emitted light enters into the optical guide member 17. A surface 17b of the optical guide member 17 opposite to the light entry end face acts as a light radiating end face, from which the emitted light is radiated out of the optical guide member 17. Also, two rectangular surfaces 17c, 17c other than the light entry end face and the light radiating end face act as reflection surfaces, which reflect the emitted light. Specifically, the rectangular surfaces 17c, 17c act as the reflection surfaces for reflecting emitted light components M' of the emitted light, which emitted light components have been radiated out from the light collecting optical system and have spread over a range wider than the width of each of the photoelectric conversion devices 21, 21, . . . , the width being taken in the sub-scanning direction, due to scattering of the stimulating rays L and the emitted light M occurring within the stimulable phosphor sheet 50. Thus the reflection surfaces 17c, 17c reflect the emitted light components M' such that the photoelectric conversion devices 21, 21, . . . are capable of receiving the emitted light components M'. Also, the optical guide member 17 is made from a transparent material having a high refractive index (e.g., a refractive index of at least 1.4), such that the emitted light components M' are capable of being totally reflected from the reflection surfaces 17c, 17c. By way of example, the optical guide member 17 may be made from an acrylic material or a glass material.

As illustrated in FIG. 4, the optical guide member 17 should preferably be constituted such that an angle θ' of each of the reflection surfaces 17c, 17c of the optical guide member 17 with respect to the horizontal plane in FIG. 4 takes a value satisfying the relationship represented by the formula:

$$\sin^{-1}(\sin \theta/n) < \theta' < \theta$$

wherein θ represents the converging angle of the light collecting optical system, and n represents the refractive index of the optical guide member 17.

However, the angle θ' need not necessarily take a value satisfying the relationship represented by the formula shown above and may be set appropriately with the light collecting efficiency being taken into consideration.

Also, the optical guide member 17 and the light receiving surfaces of the photoelectric conversion devices 21, 21, . . . of the line sensor 20 should preferably be located such that they are optically in contact with each other. For such purposes, for example, a transparent adhesive agent maybe filled in the region between the optical guide member 17 and the light receiving surfaces of the photoelectric conversion devices 21, 21, . . . of the line sensor 20. In such cases, the problems are capable of being prevented from occurring in that the emitted light M is reflected from the light radiating end face 17b of the optical guide member 17.

Further, the area of the light entry end face 17a of the optical guide member 17, which light entry end face stands facing the second SELFOC lens array 15, should preferably be set to be large, such that the emitted light M and the emitted light components M' having been collected by the light collecting optical system are capable of being collected sufficiently.

How this embodiment of the radiation image read-out apparatus in accordance with the present invention operates will be described hereinbelow.

Firstly, the scanning belt 40 moves in the direction indicated by the arrow Y (i.e., in the sub-scanning direction), and the stimulable phosphor sheet 50, on which the radiation image has been stored and which is supported on the scanning belt 40, is conveyed in the direction indicated by the arrow Y.

Also, the stimulating ray source 11 radiates out the stimulating rays L having the linear pattern. The stimulating rays L are radiated out approximately in parallel with the surface of the stimulable phosphor sheet 50. The stimulating rays L are collimated by the optical system 12, which is constituted of the collimator lens and the toric lens and is located in the optical path of the stimulating rays L. The collimated stimulating rays L are reflected from the dichroic mirror 13 to the direction that impinges perpendicularly upon the surface of the stimulable phosphor sheet 50. The reflected stimulating rays L are converged by the first SELFOC lens array 14 into a linear beam extending along the direction indicated by the arrow X (i.e., in the main scanning direction) on the stimulable phosphor sheet 50.

When the stimulating rays L impinge upon an area of the stimulable phosphor sheet 50, the stimulating rays L stimulate the stimulable phosphor contained in the exposed area of the stimulable phosphor sheet 50. Also, the stimulating rays L enter from the exposed area of the stimulable phosphor sheet 50 into the stimulable phosphor sheet 50 and diffuse to the areas neighboring with the exposed area. Thus the stimulating rays L also stimulate the stimulable phosphor contained in the areas neighboring with the exposed area of the stimulable phosphor sheet 50. Also, the light, which is emitted from the exposed area of the stimulable phosphor sheet 50 when the stimulating rays L are irradiated to the stimulable phosphor sheet 50, diffuses to the areas neighboring with the exposed area of the stimulable phosphor sheet 50 and stimulates the stimulable phosphor. As a result, the emitted light M and the emitted light components M' having an intensity in accordance with the image information stored on the stimulable phosphor sheet 50 emanate from the area containing the exposed area and the neighboring areas.

The emitted light M and the emitted light components M' are collimated by the first SELFOC lens array 14, pass through the dichroic mirror 13, and are collected by the second SELFOC lens array 15 onto the light entry end face 17a of the optical guide member 17. At this time, in cases where the stimulating rays L, which have been reflected from the surface of the stimulable phosphor sheet 50, are mixed slightly in the emitted light M and the emitted light components M' having passed through the second SELFOC lens array 15, the stimulating rays L are filtered out by the stimulating ray cut-off filter 16. Therefore, the stimulating rays L do not impinge upon the light entry end face 17a of the optical guide member 17.

As illustrated in FIG. 4, of the emitted light M and the emitted light components M' having been collected onto the light entry end face 17a of the optical guide member 17, the emitted light components M', which have spread over the range wider than the width of each of the photoelectric conversion devices 21, 21, . . . of the line sensor 20, are reflected by the reflection surfaces 17c, 17c of the optical guide member 17, such that the emitted light components M' are capable of being received by each of the photoelectric conversion devices 21, 21, . . . of the line sensor 20. Each of the photoelectric conversion devices 21, 21, . . . of the line sensor 20 receives the emitted light M and the emitted light components M', which emitted light components have been reflected from the reflection surfaces 17c, 17c. Also, each of the photoelectric conversion devices 21, 21, . . . of the line sensor 20 performs the photoelectric conversion of the emitted light M and the emitted light components M' having thus been received. An image signal having thus been obtained from the line sensor 20 is fed into the reading means 30. The reading means 30 converts the image signal into a digital image signal and feeds the digital image signal into an image processing unit.

With the aforesaid embodiment of the radiation image read-out apparatus in accordance with the present invention, of the light emitted by the stimulable phosphor sheet 50, the emitted light components M', which have been radiated out from the light collecting optical system and have spread over the range wider than the width of each of the photoelectric conversion devices 21, 21, . . . of the line sensor 20, are reflected by the reflection surfaces 17c, 17c of the optical guide member 17 and are thereby received by each of the photo electric conversion devices 21, 21, . . . of the line sensor 20. Therefore, the light collecting efficiency is capable of being enhanced, and the image signal having a high signal-to-noise ratio is capable of being obtained.

Also, in the embodiment described above, the optical guide member 17 is made from the material having a high refractive index, and the emitted light components M' are totally reflected by the reflection surfaces 17c, 17c. Alternatively, in cases where the optical guide member 17 is utilized, which has a refractive index such that the reflection surfaces 17c, 17c do not effect the total reflection of the emitted light components M', each of the reflection surfaces 17c, 17c may be covered with a reflecting material for reflecting the emitted light components M'. In such cases, the material having a high refractive index need not be utilized as the material of the optical guide member 17, and the emitted light components M' are capable of being efficiently reflected by the reflection surfaces 17c, 17c.

Figure 5:
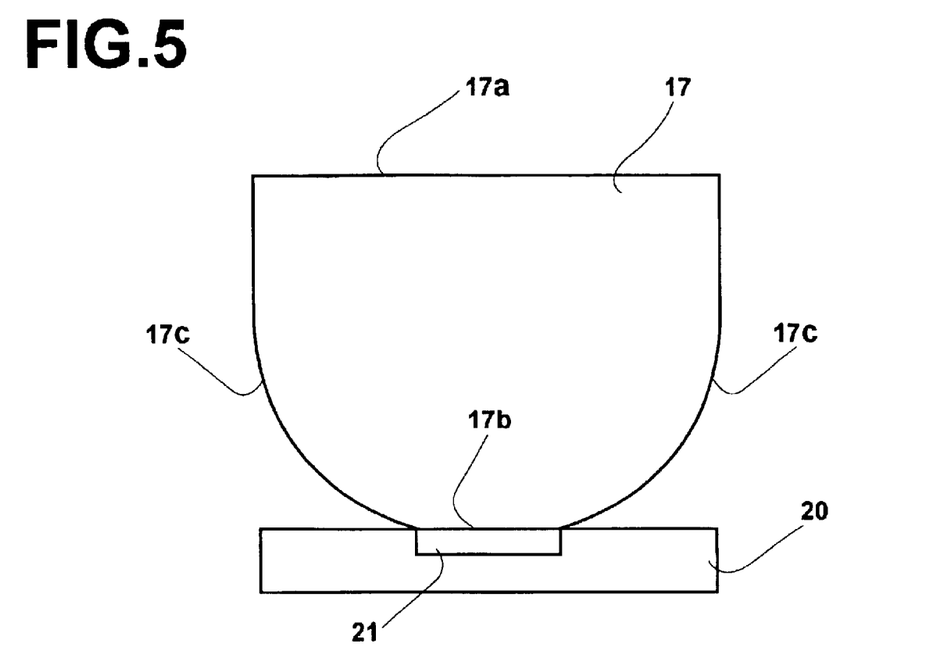
FIG. 5 is an explanatory view showing a second example of an optical guide member in the embodiment of FIG. 1.

Further, in the embodiment described above, the optical guide member 17, in which each of the reflection surfaces 17c, 17c is a flat surface, is employed. Alternatively, as illustrated in FIG. 5, an optical guide member 17', in which each of the reflection surfaces 17c, 17c is a curved surface, may be employed. In cases where each of the reflection surfaces 17c, 17c is constituted of the curved surface, the curved surface should preferably be set such that the radius of curvature of the curved surface becomes small from the light entry end face 17a toward the light radiating end face 17b of the optical guide member 17'.

Figure 6:
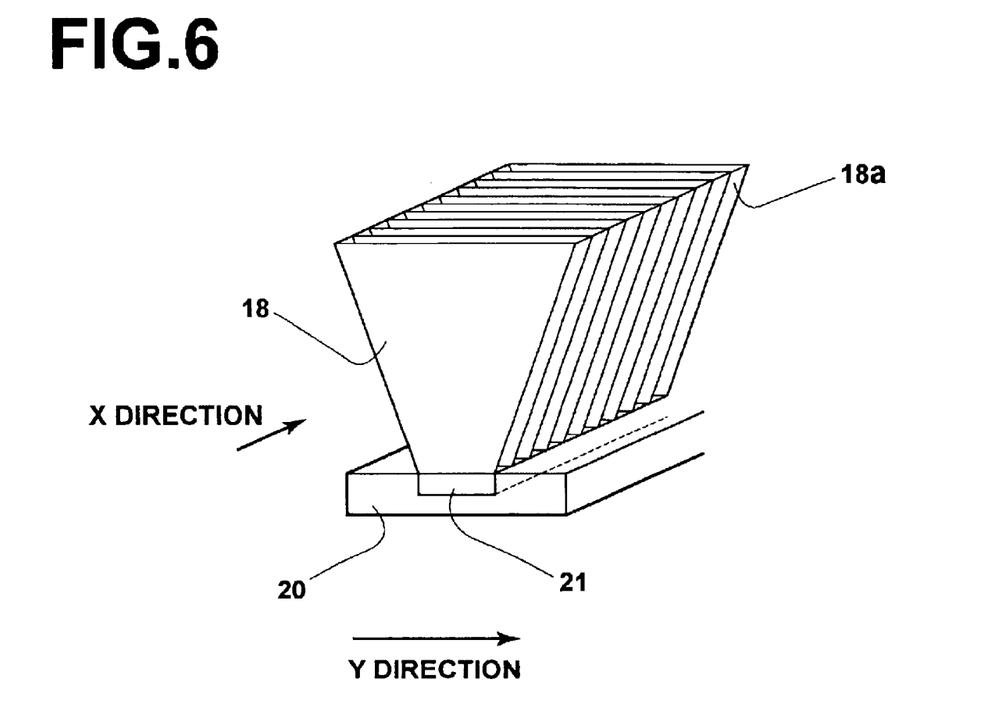
FIG. 6 is an explanatory view showing a third example of an optical guide member in the embodiment of FIG. 1.

Furthermore, as in an optical guide member 18 illustrated in FIG. 6, the optical guide member 17 employed in the embodiment described above may be divided into a plurality of subdivisions 18a, 18a, . . . at predetermined pitches with respect to the main scanning direction. In such cases, the emitted light, which has spread in the main scanning direction, is capable of being reflected by the divisional cross-section of each of the subdivisions 18a, 18a, . . . of the optical guide member 18 and is thus capable of being received by each of the photoelectric conversion devices 21, 21, . . . of the line sensor 20. Also, the predetermined pitches, at which the optical guide member 18 is divided into the plurality of the subdivisions 18a, 18a, . . . , should preferably be identical with the array pitches of the photoelectric conversion devices 21, 21, . . . of the line sensor 20 with respect to the main scanning direction. Further, in cases where the optical guide member 18 comprising the subdivisions 18a, 18a, . . . is utilized, a focal surface for the emitted light having been collected by the light collecting optical system should preferably be set at the light entry end face of the optical guide member 18. In such cases, the light collecting efficiency is capable of being enhanced even further. Furthermore, the divisional cross-section of each of the subdivisions 18a, 18a, . . . of the optical guide member 18 should preferably be covered with a reflecting material capable of reflecting the emitted light. In such cases, the optical guide member 18 may be produced with a process for coating the reflecting material onto one surface of each of acrylic thin films, each of which has a thickness of approximately 100 μm, and laminating the acrylic thin films having been coated with the reflecting material.

In cases where the optical guide member 18 comprising the subdivisions 18a, 18a, . . . divided from one another at the predetermined pitches with respect to the main scanning direction is utilized, the problems are capable of being prevented from occurring in that the light emitted from a certain site (a certain pixel) on the stimulable phosphor sheet 50 is adversely affected by the light emitted from a pixel on the stimulable phosphor sheet 50, which pixel is adjacent to the certain pixel in the main scanning direction. Therefore, an image signal representing an image having a high image sharpness is capable of being obtained.

Figure 7:
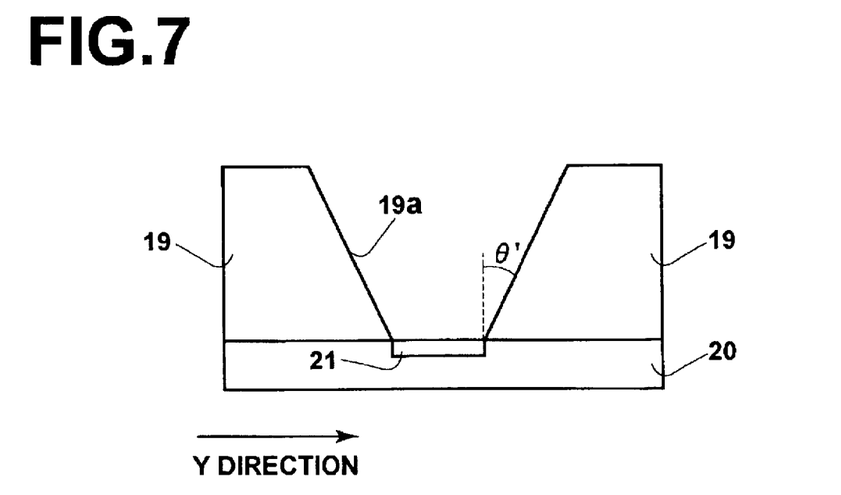
FIG. 7 is an explanatory view showing a fourth example of an optical guide member in the embodiment of FIG. 1.

Also, as illustrated in FIG. 7, it is possible to employ an optical guide member comprising two optical guide sub-members 19, 19, each of which is constituted of a prism extending along the main scanning direction. Each of the optical guide sub-members 19, 19 is located on the side outward from each of the two ends of the array of the photoelectric conversion devices 21, 21, . . . , the two ends being taken with respect to the sub-scanning direction, and at the position close to each of the two ends of the array of the photoelectric conversion devices 21, 21, . . . In such cases, the emitted light components M', which have been radiated out from the light collecting optical system and have spread over the range wider than the width of each of the photoelectric conversion devices 21, 21, . . . of the line sensor 20, are reflected by reflection surfaces 19a, 19a of the optical guide sub-members 19, 19 and are thereby received by each of the photoelectric conversion devices 21, 21, . . . of the line sensor 20. In such cases, the angle θ' of each of the reflection surfaces 19a, 19a of the optical guide sub-members 19, 19 should preferably be approximately identical with the converging angle θ of the light collecting optical system. Also, each of the reflection surfaces 19a, 19a may be coated with the reflecting material for reflecting the emitted light components M'.

Figure 8:
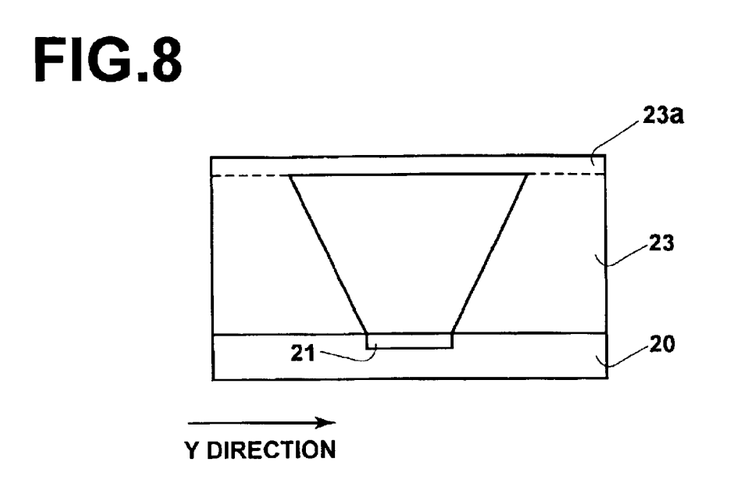
FIG. 8 is an explanatory view showing a fifth example of an optical guide member in the embodiment of FIG. 1.

Further, as illustrated in FIG. 8, in cases where the optical guide member shown in FIG. 7 is utilized, the optical guide sub-members 19, 19 may be combined with a cover glass 23a, which protects the photoelectric conversion devices 21, 21, . . . of the line sensor 20, into an integral body. In this manner, an optical guide member 23 may be formed.

Figure 9:
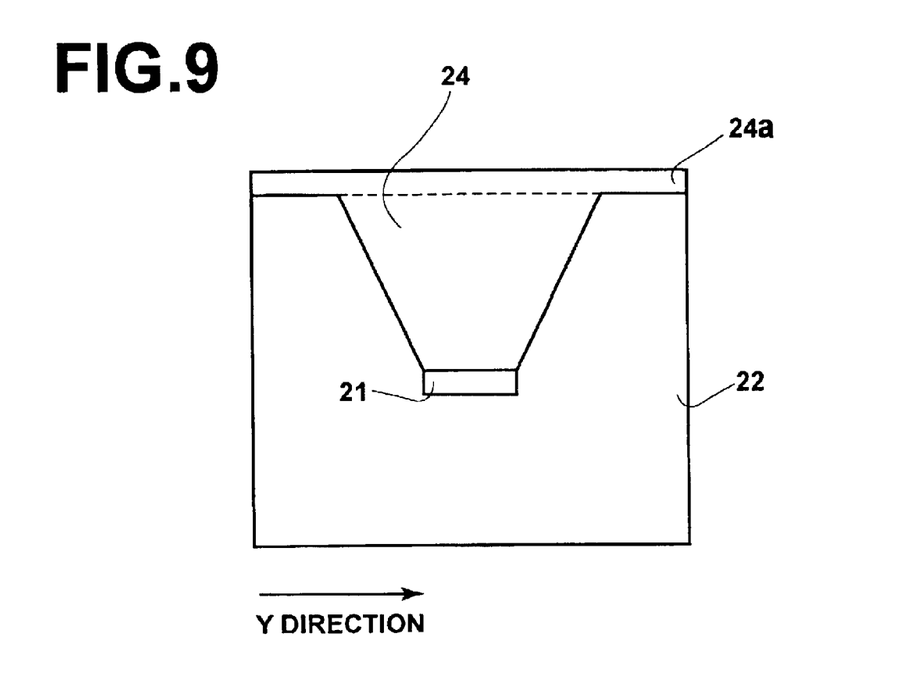
FIG. 9 is an explanatory view showing a sixth example of an optical guide member in the embodiment of FIG. 1.

Furthermore, as illustrated in FIG. 9, in cases where a line sensor 22 comprising packaged photoelectric conversion devices 21, 21, . . . is employed, the optical guide member 17 shown in FIG. 4 may be combined with a cover glass 24a, which protects the photoelectric conversion devices 21, 21, . . . of the line sensor 22, into an integral body. In this manner, an optical guide member 24 may be formed.

The radiation image read-out apparatus in accordance with the present invention is not limited to the embodiments described above. For example, the stimulating ray source, the light collecting optical system located between the stimulating ray source and the stimulable phosphor sheet, the optical system located between the stimulable phosphor sheet and the line sensor, and the line sensor may be modified in various ways. Also, the radiation image read-out apparatus in accordance with the present invention may comprise the image processing unit for performing various types of image processing on the image signal having been obtained from the reading means. Further, the radiation image read-out apparatus in accordance with the present invention may comprise erasing means for appropriately erasing energy remaining on the stimulable phosphor sheet, from which the image signal has been detected.

What is claimed is:

1. A radiation image read-out method, comprising the steps of:

i) linearly irradiating stimulating rays onto an area of a surface of a stimulable phosphor sheet, on which a radiation image has been stored, with stimulating ray irradiating means, such that the stimulating rays are linear along a main scanning direction on the surface of the stimulable phosphor sheet, the stimulating rays causing the stimulable phosphor sheet to emit light in proportion to an amount of energy stored thereon during its exposure to radiation, ii) receiving the light, which is emitted from the linear area of the surface of the stimulable phosphor sheet exposed to the linear stimulating rays, with a line sensor via a light collecting optical system, the line sensor comprising a plurality of photoelectric conversion devices arrayed in a straight line along the main scanning direction, the received light being subjected to photoelectric conversion performed by the line sensor, iii) moving the stimulable phosphor sheet with respect to the stimulating ray irradiating means and the line sensor and in a sub-scanning direction, and iv) successively reading outputs of the line sensor in accordance with the movement, wherein an optical guide member is located between the light collecting optical system and the line sensor, the optical guide member having a reflection surface for reflecting the emitted light components of the emitted light, which emitted light components have been radiated out from the light collecting optical system and have spread over a range wider than a width of each of the photoelectric conversion devices, the width being taken in the sub-scanning direction, such that the photoelectric conversion devices are capable of receiving the emitted light components.

2. A method as defined in claim 1 wherein the optical guide member is a trapezoidal prism constituted of a transparent member, the trapezoidal prism being located close to a light receiving surface of the line sensor, a surface of the trapezoidal prism, the surface having a rectangular shape whose one side is constituted of a longer side between two parallel sides of the trapezoid, acts as a light entry end face, from which the emitted light enters into the trapezoidal prism, a surface of the trapezoidal prism opposite to the light entry end face acts as a light radiating end face, from which the emitted light is radiated out of the trapezoidal prism, at least either one of two rectangular surfaces other than the light entry end face and the light radiating end face acts as the reflection surface, whereby the emitted light components having entered from the light entry end face into the trapezoidal prism are reflected by the reflection surface and radiated out from the light radiating end face.

3. A method as defined in claim 2 wherein the trapezoidal prism constituting the optical guide member is divided into a plurality of subdivisions at predetermined pitches with respect to the main scanning direction, and a divisional cross-section of each of the subdivisions of the trapezoidal prism is set to be capable of reflecting the emitted light.

4. A method as defined in claim 3 wherein the divisional cross-section of each of the subdivisions of the trapezoidal prism is covered with a reflecting material capable of reflecting the emitted light.

5. A method as defined in claim 1 wherein the optical guide member is a prism, which is located on a side outward from at least either one of two ends of a light receiving surface of the line sensor, the two ends being taken with respect to the sub-scanning direction, and at a position close to the at least either one of the two ends of the light receiving surface of the line sensor, and which extends along the main scanning direction.

6. A method as defined in claim 1, 2, 3, 4, or 5 wherein the reflection surface of the optical guide member is covered with a reflecting material capable of reflecting the emitted light components.

7. A method as defined in claim 1, 2, 3, 4, or 5 wherein the optical guide member has a refractive index such that the emitted light components are totally reflected by the reflection surface of the optical guide member.

8. A radiation image read-out apparatus, comprising:

i) stimulating ray irradiating means for linearly irradiating stimulating rays onto an area of a surface of a stimulable phosphor sheet, on which a radiation image has been stored, such that the stimulating rays are linear along a main scanning direction on the surface of the stimulable phosphor sheet, the stimulating rays causing the stimulable phosphor sheet to emit light in proportion to an amount of energy stored thereon during its exposure to radiation, ii) a line sensor for receiving the light, which is emitted from the linear area of the surface of the stimulable phosphor sheet exposed to the linear stimulating rays, via a light collecting optical system, and performing photoelectric conversion of the received light, the line sensor comprising a plurality of photoelectric conversion devices arrayed in a straight line along the main scanning direction, iii) scanning means for moving the stimulable phosphor sheet with respect to the stimulating ray irradiating means and the line sensor and in a sub-scanning direction, and iv) reading means for successively reading outputs of the line sensor in accordance with the movement, wherein an optical guide member is located between the light collecting optical system and the line sensor, the optical guide member having a reflection surface for reflecting the emitted light components of the emitted light, which emitted light components have been radiated out from the light collecting optical system and have spread over a range wider than a width of each of the photoelectric conversion devices, the width being taken in the sub-scanning direction, such that the photoelectric conversion devices are capable of receiving the emitted light components.

9. An apparatus as defined in claim 8 wherein the optical guide member is a trapezoidal prism constituted of a transparent member, the trapezoidal prism being located close to a light receiving surface of the line sensor, a surface of the trapezoidal prism, the surface having a rectangular shape whose one side is constituted of a longer side between two parallel sides of the trapezoid, acts as a light entry end face, from which the emitted light enters into the trapezoidal prism, a surface of the trapezoidal prism opposite to the light entry end face acts as a light radiating end face, from which the emitted light is radiated out of the trapezoidal prism, at least either one of two rectangular surfaces other than the light entry end face and the light radiating end face acts as the reflection surface, whereby the emitted light components having entered from the light entry end face into the trapezoidal prism are reflected by the reflection surface and radiated out from the light radiating end face.

10. An apparatus as defined in claim 9 wherein the trapezoidal prism constituting the optical guide member is divided into a plurality of subdivisions at predetermined pitches with respect to the main scanning direction, and a divisional cross-section of each of the subdivisions of the trapezoidal prism is set to be capable of reflecting the emitted light.

11. An apparatus as defined in claim 10 wherein the divisional cross-section of each of the subdivisions of the trapezoidal prism is covered with a reflecting material capable of reflecting the emitted light.

12. An apparatus as defined in claim 8 wherein the optical guide member is a prism, which is located on a side outward from at least either one of two ends of a light receiving surface of the line sensor, the two ends being taken with respect to the sub-scanning direction, and at a position close to the at least either one of the two ends of the light receiving surface of the line sensor, and which extends along the main scanning direction.

13. An apparatus as defined in claim 8, 9, 10, 11, or 12 wherein the reflection surface of the optical guide member is covered with a reflecting material capable of reflecting the emitted light components.

14. An apparatus as defined in claim 8, 9, 10, 11, or 12 wherein the optical guide member has a refractive index such that the emitted light components are totally reflected by the reflection surface of the optical guide member.

* * * * *